UNITED STATES PATENT OFFICE.

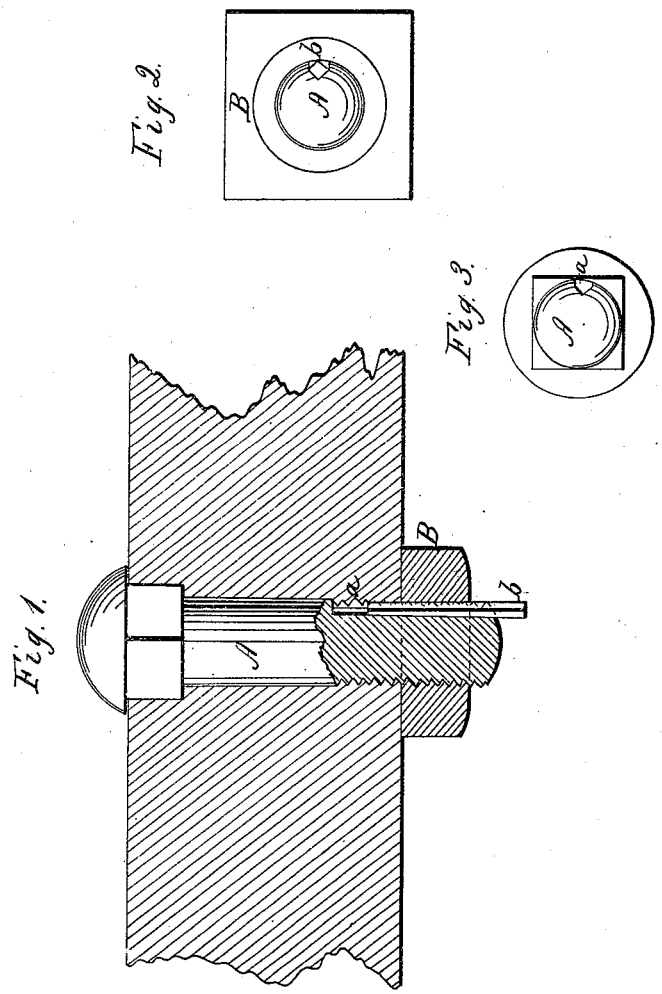

WILLIAM HAMILTON, OF TORONTO, CANADA.

IMPROVEMENT IN LOCK-NUTS.

Specification forming part of Letters Patent No. 85,381, dated December 29, 1868.

*To all whom it may concern:*

Be it known that I, WILLIAM HAMILTON, of Toronto, Canada, have invented a new and useful Improvement in Locking Nuts on Bolts; and I do hereby declare that the following is a full, clear, and exact description thereof, which will enable others skilled in the art to make and use the same, reference being had to the accompanying drawings, forming part of this specification, in which—

Figure 1 represents my improved bolt fastened with an immovable nut to a piece of timber. Fig. 2 is an end view of the bolt, with the nut locked to it by a key. Fig. 3 is a view of the small end of a bolt, showing the groove for receiving a key to lock it to the nut.

Similar letters of reference indicate like parts.

The object of this invention is to prevent nuts on bolts from turning and becoming loose, which, in many positions where there is vibration, and especially on railroad-cars and vehicles of all kinds, is a cause of frequent complaint, and often of damage. This object is accomplished by my improvement, in the simplest and most effective manner, by sinking a groove in the side of the bolt when it is swaged, in which groove a key is driven at the end, which cuts through the threads of the nut, and locks it firmly and permanently in the position to which it is screwed.

A is a bolt, in the screw end of which is sunk an angular groove, $a$, Fig. 3, which is filled with a metal key, $b$, driven up in the end, through the thread of the nut B, after it is screwed in tight in the position where it is to remain permanently, as shown in Figs. 1 and 2.

The effect of this simple device is obvious. By driving the key into the groove $a$ of the bolt A, the metal key will force itself through the threads of the nut B, in such manner as to jam and lock it firmly, so that it will never start or turn on the bolt by any amount of vibration.

When necessary, the key may be readily withdrawn, without injury to the bolt or nut, with a pair of tongs made for the purpose, and the bolt, nut, and key can be used again.

I am aware that it is not new to prevent a nut from turning upon its bolt by driving a key into corresponding grooves previously formed in both the bolt and nut, and I therefore do not claim such invention; but,

Having thus described my invention, I claim as new and desire to secure by Letters Patent—

The nut B, secured to the bolt by providing a groove in the latter, and driving the key $b$ into said groove through the threads of the nut at any point, substantially as herein shown and described.

WILLIAM HAMILTON.

Witnesses:
    WM. HAMILTON, Jr.,
    JOHN ABLITT.